(12) United States Patent
Wiman et al.

(10) Patent No.: US 11,483,540 B2
(45) Date of Patent: Oct. 25, 2022

(54) METHOD AND CORRESPONDING SYSTEM FOR GENERATING VIDEO-BASED 3-D MODELS OF A TARGET SUCH AS A DYNAMIC EVENT

(71) Applicant: I-CONIC VISION AB, Stockholm (SE)

(72) Inventors: Håkan Wiman, Stockholm (SE); Mikael Stern, Stockholm (SE)

(73) Assignee: I-CONIC VISION AB, Stockholm (SE)

( * ) Notice: Subject to any disclaimer, the term of this patent is extended or adjusted under 35 U.S.C. 154(b) by 4 days.

(21) Appl. No.: 17/268,364

(22) PCT Filed: Jul. 22, 2019

(86) PCT No.: PCT/SE2019/050707
§ 371 (c)(1),
(2) Date: Feb. 12, 2021

(87) PCT Pub. No.: WO2020/040679
PCT Pub. Date: Feb. 27, 2020

(65) Prior Publication Data
US 2021/0306614 A1    Sep. 30, 2021

Related U.S. Application Data

(60) Provisional application No. 62/720,982, filed on Aug. 22, 2018.

(51) Int. Cl.
*H04N 13/275* (2018.01)
*G06T 7/593* (2017.01)
(Continued)

(52) U.S. Cl.
CPC ......... *H04N 13/275* (2018.05); *B64C 39/024* (2013.01); *G06T 7/593* (2017.01);
(Continued)

(58) Field of Classification Search
CPC ... H04N 13/275; H04N 13/111; H04N 13/239
See application file for complete search history.

(56) References Cited

U.S. PATENT DOCUMENTS

2007/0093945 A1    4/2007  Grzywna et al.
2014/0119716 A1    5/2014  Ohtomo et al.
(Continued)

FOREIGN PATENT DOCUMENTS

CN    106454209    2/2017
CN    108615243    10/2018
(Continued)

OTHER PUBLICATIONS

International Preliminary Report on Patentability for PCT/SE2019/050707 dated Apr. 20, 2020, 22 pages.
(Continued)

*Primary Examiner* — Jayanti K Patel
*Assistant Examiner* — Christopher Kingsbury Glover
(74) *Attorney, Agent, or Firm* — Nixon & Vanderhye

(57) ABSTRACT

There is disclosed a method and corresponding systems for generating one or more video-based models of a target. The method understood providing video streams from at least two moving or movable vehicles equipped with cameras for simultaneously imaging the target from different viewpoints. Position synchronization of the moving or movable vehicles is provided to create a stable image base, which represents the distance between the moving or movable vehicles. Pointing synchronization of the cameras is provided to cover the same object and/or dynamic event. Time synchronization of the video frames of the video streams is provided to obtain, for at least one point in time, a set of simultaneously registered video frames. The method further included generating, for the at least one point in time, at least one three-dimensional, 3D.

17 Claims, 7 Drawing Sheets

(51) Int. Cl.
*H04N 13/204* (2018.01)
*H04N 13/296* (2018.01)
*B64C 39/02* (2006.01)

(52) U.S. Cl.
CPC ......... *H04N 13/204* (2018.05); *H04N 13/296* (2018.05); *B64C 2201/123* (2013.01); *B64C 2201/127* (2013.01); *B64C 2201/146* (2013.01)

(56) References Cited

U.S. PATENT DOCUMENTS

| | | | |
|---|---|---|---|
| 2016/0327950 A1 | 11/2016 | Bachrach et al. | |
| 2017/0053169 A1* | 2/2017 | Cuban | G06V 20/13 |
| 2018/0091704 A1 | 3/2018 | Koyama et al. | |
| 2018/0091797 A1 | 3/2018 | Armatorio et al. | |
| 2018/0165875 A1* | 6/2018 | Yu | G06T 7/246 |
| 2019/0037207 A1 | 1/2019 | Brockers et al. | |
| 2019/0250601 A1 | 8/2019 | Donahoe et al. | |
| 2020/0327703 A1* | 10/2020 | Aflaki Beni | H04N 13/239 |
| 2021/0029345 A1* | 1/2021 | Matsunobu | G06T 7/593 |
| 2021/0044787 A1* | 2/2021 | Matsunobu | H04N 21/21805 |
| 2021/0144404 A1* | 5/2021 | Aflaki Beni | H04N 19/597 |

FOREIGN PATENT DOCUMENTS

| | | |
|---|---|---|
| EP | 2 728 308 A2 | 5/2014 |
| EP | 2 728 308 A3 | 12/2014 |

OTHER PUBLICATIONS

International Search Report for PCT/SE2019/050707 dated Oct. 30, 2019, 5 pages.
Written Opinion of the ISA for PCT/SE2019/050707 dated Oct. 30, 2019, 7 pages.
Extended European Search Report issued in European Patent Application No. 19850915.0 dated Apr. 20, 2022.
Craciun, "Joint image-laser digitization for 3D modeling of complex environments," Telecom Paris Tech, Jul. 7, 2010, pp. 1-286.

* cited by examiner

METHOD AND CORRESPONDING SYSTEM FOR GENERATING VIDEO-BASED 3-D MODELS OF A TARGET SUCH AS A DYNAMIC EVENT

This application is the U.S. national phase of International Application No. PCT/SE2019/050707 filed Jul. 22, 2019 which designated the U.S. and claims priority to U.S. Provisional Patent Application No. 62/720,982 filed Aug. 22, 2018, the entire contents of each of which are hereby incorporated by reference.

TECHNICAL FIELD

The proposed technology generally relates to a method and corresponding system for generating one or more video-based models of a target such as a dynamic event, a dynamic sensor system, a ground-based system configured to generate one or more video-based models of a target as well as a corresponding computer program and computer-program product.

BACKGROUND

Video taken from moving or movable vehicles such as aerial vehicles and/or surface-based vehicles and/or underwater vehicles including manned and/or unmanned (uncrewed) vehicles such as drones and/or Unmanned Aerial Vehicles (UAVs) can already today give emergency and security authorities and armed forces support for rapid decisions in crisis situations. Such situations may for example include fires, accidents, flooding and/or other security or military operations and the like. Other target scenarios may include sports events, movie productions and the like.

However, there is a general need for improved video-based models of target scenarios such as dynamic events and/or enhanced decision support based on such models, e.g. to extend imagery based 3D models to include also dynamic events for improved visualization, user interaction and/or decision support.

SUMMARY

It is an object to provide a method for generating one or more video-based models of a target.

It is also an object to provide a system configured to generate one or more video-based models of a target.

Another object is to provide a dynamic sensor system.

Yet another object is to provide a ground-based system configured to generate one or more video-based models of a target.

Still another object is to provide a computer program for generating, when executed by a processor, one or more video-based models of a target.

It is also an object to provide a corresponding computer-program product,

According to a first aspect, there is provided a method for generating one or more video-based models of a target. The method comprises:

providing video streams from at least two moving or movable vehicles equipped with cameras for simultaneously imaging the target from different viewpoints, wherein position synchronization of the moving or movable vehicles is provided to create a stable image base, which represents the distance between the moving or movable vehicles, wherein pointing synchronization of the cameras is provided to cover the same object(s) and/or dynamic event(s), and wherein time synchronization of the video frames of the video streams is provided to obtain, for at least one point in time, a set of one or more simultaneously registered video frames; and generating, for said at least one point in time, at least one three-dimensional, 3D, model of the target based on the corresponding set of simultaneously registered video frames.

According to a second aspect, there is provided a system configured to generate one or more video-based models of a target. The system is configured to provide video streams from at least two moving or movable vehicles equipped with cameras for simultaneously imaging the target from different viewpoints. Position synchronization of the moving or movable vehicles is provided to create a stable image base. Pointing synchronization of the cameras is provided to cover the same object(s) and/or dynamic event(s), and time synchronization of the video frames of the video streams is enabled to obtain, for at least one point in time, a set of simultaneously registered video frames. The system is also configured to generate, for said at least one point in time, at least one three-dimensional, 3D, model of the target based on the corresponding set of simultaneously registered video frames.

According to a third aspect, there is provided a dynamic sensor system. The dynamic sensor system comprises a set of synchronously operative moving or movable vehicles equipped with cameras to enable video streams for simultaneously imaging a target from different viewpoints. The dynamic sensor system is configured to operate based on position synchronization of the moving or movable vehicles to create a stable image base, and the dynamic sensor system is configured to operate based on pointing synchronization of the cameras to cover the same object(s) and/or dynamic event(s). The dynamic sensor system is also configured to enable time synchronization of the video frames of the video streams to allow, for at least one point in time, generation and/or extraction of a set of simultaneously registered video frames. The dynamic sensor system is further configured to downlink image data of the video streams to a ground segment from at least one of the moving or movable vehicles to enable generation of one or more three-dimensional/four-dimensional, 3D/4D, models of the target based on the simultaneously registered video frames at the ground segment.

According to a fourth aspect, there is provided a ground-based system configured to generate one or more video-based models of a target. The system is configured to receive video streams from at least two moving or movable vehicles equipped with cameras for simultaneously imaging the target from different viewpoints. The moving or movable vehicles being operated based on position synchronization for a stable image base, and the cameras being operated based on pointing synchronization for covering the same object(s) and/or dynamic event(s), and time synchronization of the video frames of the video streams being enabled to allow, for at least one point in time, generation and/or extraction of a set of simultaneously registered video frames. The system is also configured to generate, for said at least one point in time, at least one three-dimensional, 3D, model of the target based on the corresponding set of simultaneously registered video frames.

According to a fifth aspect, there is provided a computer program for generating, when executed by a processor, one or more video-based models of a target. The computer program comprises instructions, which when executed by the processor, cause the processor to:

receive video streams from at least two moving or movable vehicles equipped with cameras for simultaneously imaging the target from different viewpoints, the moving or movable vehicles being operated based on position synchronization for a stable image base, the cameras being operated based on pointing synchronization for covering the same object(s) and/or dynamic event(s), and time synchronization of the video frames of the video streams being provided to obtain, for at least one point in time, a set of simultaneously registered video frames; and generate, for said at least one point in time, at least one three-dimensional, 3D, model or four-dimensional, 4D, model of the target based on the corresponding set of simultaneously registered video frames.

According to a sixth aspect, there is provided a computer-program product comprising a non-transitory computer-readable medium carrying such a computer program.

Other advantages of the invention will be appreciated when reading the below detailed description.

BRIEF DESCRIPTION OF DRAWINGS

The invention, together with further objects and advantages thereof, may best be understood by making reference to the following description taken together with the accompanying drawings, in which.

DETAILED DESCRIPTION

Figure 1:
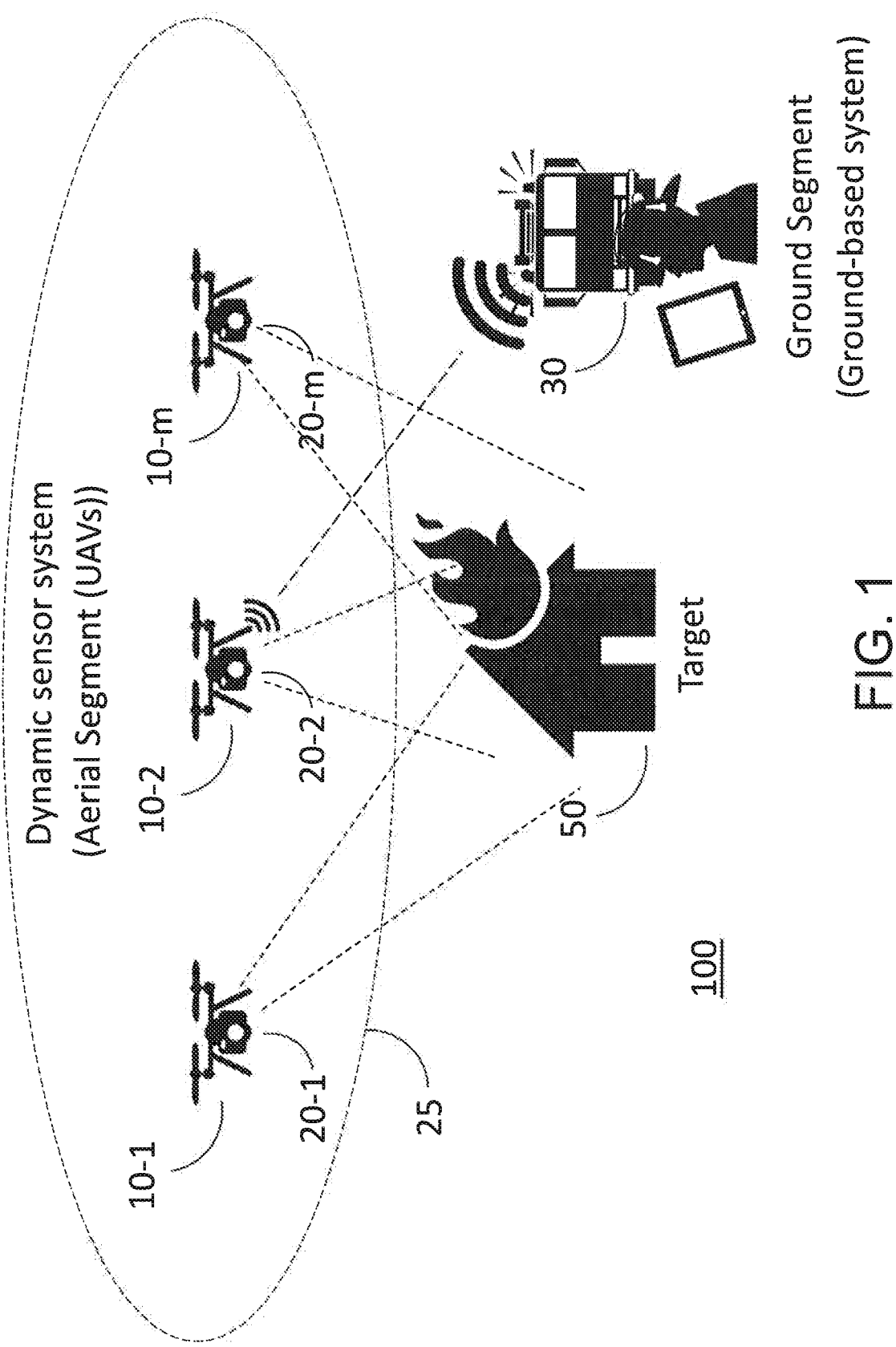
FIG. 1 is a schematic diagram illustrating an example of an overall system view including basic system components.

As mentioned, video taken from moving or movable vehicles such as aerial vehicles and/or surface-based vehicles (e.g. water and/or ground-based vehicles) and/or underwater vehicles, including manned and/or unmanned (unscrewed) vehicles such as drones and/or Unmanned Aerial Vehicles (UAVs) can already today give emergency and security authorities and armed forces support for rapid decisions in crisis situations. The innovation takes the decision support a big step forward by allowing creation of real-time 3D models as well as 4D models, i.e. a series of time-dependent 3D models.

The proposed technology is also applicable for providing video-based models of other events, such as sport events, and for movie productions and the like The advanced models of the present invention not only allow visualization of fixed objects, but also of dynamic events such as moving vehicles, smoke plumes, floods, accidents and crowds, e.g. using photogrammetry. This gives the user the opportunity to study dynamic events in the same way that we study static 3D models, e.g. from the angles and with the zooming desired by the user. The innovation also enables manual and automatic measurements of the dimensions (e.g. volume, area, length, height), directions and speed of moving objects.

Moving objects, for example vehicles, can however only be reconstructed in three dimensions when they have been imaged from different viewpoints in at least two images simultaneously. Using two or more images in a single video or still image sequence from one drone, the moving object will have changed position and/or shape, thus disabling 3D reconstruction by photogrammetric and computer vision techniques.

This innovation makes use of two or more drones or similar moving or movable vehicles with synchronized or at least synchronizable video streams to enable simultaneous imaging from different viewpoints and hence 3D reconstruction of a target. For example, each pair or more generally m-tuple (m≥2, where m represents the number of cameras) of simultaneously registered images or video frames enables generation of a 3D model for a particular point in time, $t_i$. The union of all 3D models for a time interval $t_0$ to $t_n$, e.g. the length of the simultaneous video recordings or a selected subset thereof, constitute a 4D model. Here, n represents the number of points in time. In such a 4D model, the user can navigate in both the three spatial dimensions and in the time dimension.

For simplicity, the term video will now be used to represent any kind of image sequences.

For simplicity, the term drone will now be used to represent any suitable controllably moving or movable vehicle from which video sequences of events can be taken and used for 3D/4D modelling.

It should though be understood that other types of vehicles may be used by the present innovation, including aerial and/or surface vehicles, as well as unmanned and/or manned vehicles. It should also be understood that vehicles may hold passengers and/or even drivers but still be more or less autonomous, such as self-driving cars. In particular embodiments, unmanned or uncrewed vehicles such as drones may be used. In some applications, it may be desirable to use unmanned aerial vehicles, whereas in other applications unmanned surface vehicles may be preferred. The term terrain height shall be interpreted as object distance for applicable vehicles and applications, e.g. for vehicles that are not aerial.

It should also be understood that the moving or movable vehicles may be performing very small corrective and/or adaptive movements to maintain a certain position, at least for a given period of time, e.g. when drones are temporarily hovering over a target area.

The term target will be used to represent any general target area and/or situation of interest.

By way of example, the target may represent one or more dynamic events and include one or more moving objects. This represents a particularly interesting application.

It should though be understood that apart from modeling dynamic events, the proposed technology may also be useful for allowing faster coverage of a given geographical area and/or improved accuracy for real-time processing.

Figure 7:
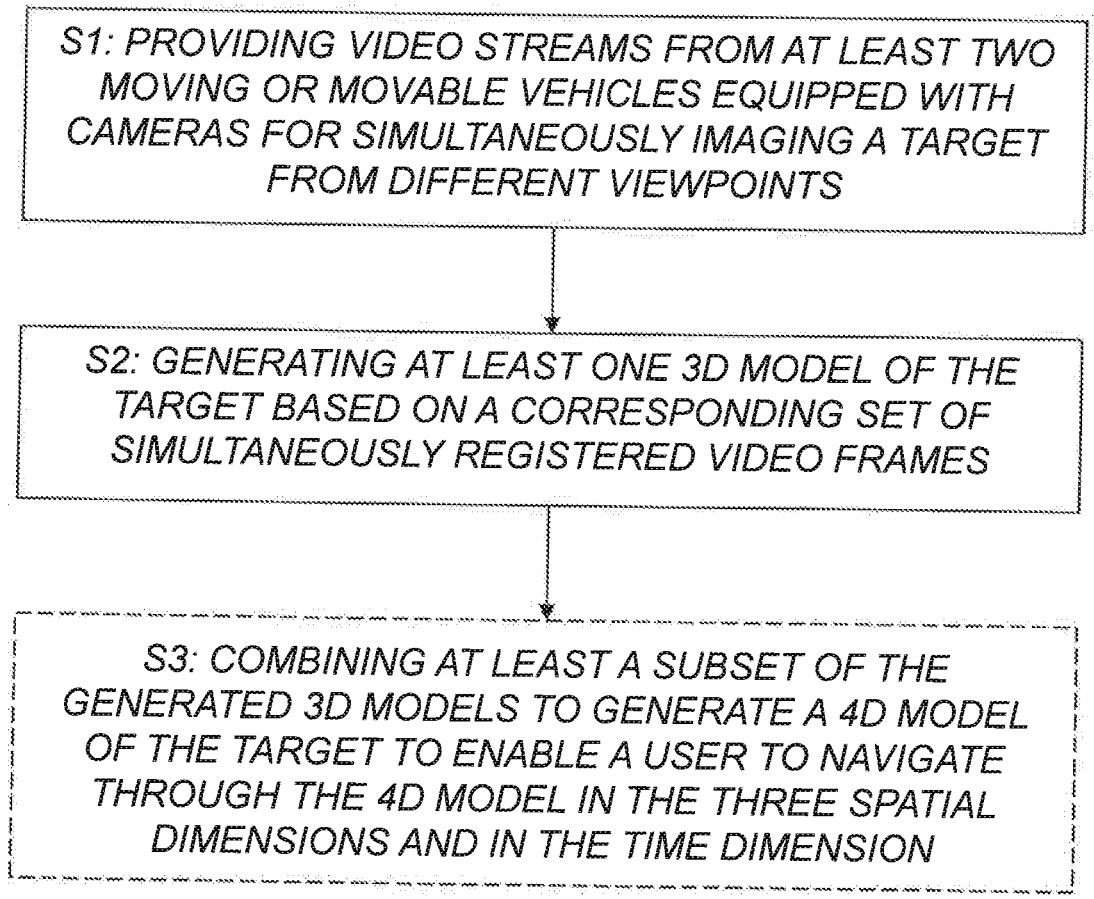
FIG. 7 is a schematic flow diagram illustrating an example of a method for generating one or more video-based models of a target.

According to a first aspect, there is provided a method for generating one or more video-based models of a target. For example, reference can be made to the schematic flow diagram of FIG. 7.

Basically, the method comprises:

S1: providing synchronized video streams from at least two moving or movable vehicles equipped with cameras for simultaneously imaging the target from different viewpoints,
    wherein position synchronization of the moving or movable vehicles is provided to create a stable image base, which represents the distance between the moving or movable vehicles,
    wherein pointing synchronization of the cameras is provided to cover the same object(s) and/or dynamic event(s), and
    wherein time synchronization of the video frames of the video streams is provided to obtain, for at least one point in time, a set of simultaneously registered video frames; and S2: generating, for said at least one point in time, at least one three-dimensional, 3D, model of the target based on the corresponding set of simultaneously registered video frames.

In a particular example, time synchronization of the video frames of the video streams is provided to obtain, for each of a plurality of points in time, a set of simultaneously registered video frames. In this case, at least one 3D model of the target may be generated, for each one of a selected set of the plurality of points in time, based on the corresponding set of simultaneously registered video frames.

Accordingly, the method may include the following optional step:

S3: combining at least a subset of the generated 3D models to generate a four-dimensional, 4D, model of the target to enable a user to navigate through the 4D model in the three spatial dimensions and in time dimension.

In general, the moving or movable vehicles represent any controllably moving or movable vehicles from which video sequences of events can be taken and used for 3D/4D modelling.

By way of example, image data based on the video streams may be downlinked to a ground segment from at least one of the moving or movable vehicles and/or a control uplink may be operated for controlling the moving or movable vehicles and/or the cameras from the ground segment.

For example, the moving or movable vehicles may include aerial vehicles and/or surface based vehicles, including manned or uncrewed vehicles.

In a particular example, the moving or movable vehicles include drones or unmanned aerial vehicles (UAVs), each having an on-board camera.

As an example, synchronous drone flight including camera pointing may be controlled from a ground segment by a front-line officer, using pre-set parameters for the flight, or the flight may be controlled autonomously.

In a particular example, the drones are configured to fly side by side, covering an area of interest across track. In another example, the drones are configured to fly one after another along track. In yet an example, the drones are configured to hover over an area of interest.

In general, the positioning and/or pointing synchronization correspond to relative orientation. By way of example, the relative orientation can be computed continuously in real-time based on the content of the video streams and used to control the drones and/or cameras such that they obtain and/or maintain desired positioning and/or pointing synchronization.

For example, more or less autonomous flight control may be implemented by using the downlinked video streams to determine and adjust the relative positions and attitudes of the drones. Accordingly, corresponding instructions and/or commands may be generated and uplinked from a ground station to the drones to maintain the base and relevant positioning and/or pointing synchronizations.

For example, the position synchronization and/or the pointing synchronization may be realized by a radio link between the drones, direct or through a ground radio station, in which the positions of the drones may be communicated so that a correct base-to-height ratio can be maintained, or the position synchronization can be realized by a flight plan, which is created before the mission.

Basically, automatic or manual pointing of the cameras may be performed to enable the target to be covered in an optimal way for photogrammetric processing of the video data.

For example, the cameras may be convergently pointing at the same object, which is imaged in the center of each image, or the cameras may be pointing strictly downwards in nadir for relaxing the requirements on pointing synchronization.

In a particular set of embodiments, the camera in each moving or movable vehicle takes a video frame at the same moment as the camera of a cooperative vehicle to provide for synchronous video takes.

By way of example, the time synchronization may be realized by matching an image of a moving object from a first vehicle at time $t_i$ with a sequence of images at times $[t_{i-n} \ldots t_{i+n}]$ from a second vehicle to find the optimal co-occurrence of the moving object at time $t_j$; $-n \leq j \leq +n$.

Optionally, a difference in time, $\Delta t = t_j - t_i$, may be equivalent with a difference in frame indexes in the video sequences, thus enabling time synchronization to the accuracy of the video frame rate.

It is also possible to the realize the time synchronization based on detecting the index of the first frame in which a distinctly colored light, lit while cameras of the moving or movable vehicles are imaging, is visible in each video, and defining the time shift between the videos as the difference in frame indexes.

Alternatively, the time synchronization may be realized by starting the cameras at the exact same time.

In a particular embodiment, stereo images, ready to be displayed stereoscopically in Virtual Reality headset or with 3D glasses, may be generated based on the registered video frames.

Dense image matching, for example, may then be performed on the stereo images to generate depth maps, where each pixel value represents relative distance between camera and imaged object.

By way of example, areas with moving objects may be identified using the depth maps.

In a particular example, background static objects are separated from dynamic moving objects, and a coherent 3D model over the target including only static terrain and static objects is generated. A database of dynamic moving objects may be created in which solid moving objects and non-solid moving objects are classified and corresponding 3D models of the dynamic solid moving objects and 3D models of dynamic non-solid moving objects are provided. The 4D model may then be based on the 3D model of static terrain and static objects and the 3D models of the dynamic solid moving objects and 3D models of dynamic non-solid moving objects.

In this way, visualization and/or decision support may be provided based on the generated 3D/4D models.

For example, the viewpoint and zooming within the 4D model may be adapted to user preferences.

Figure 2:
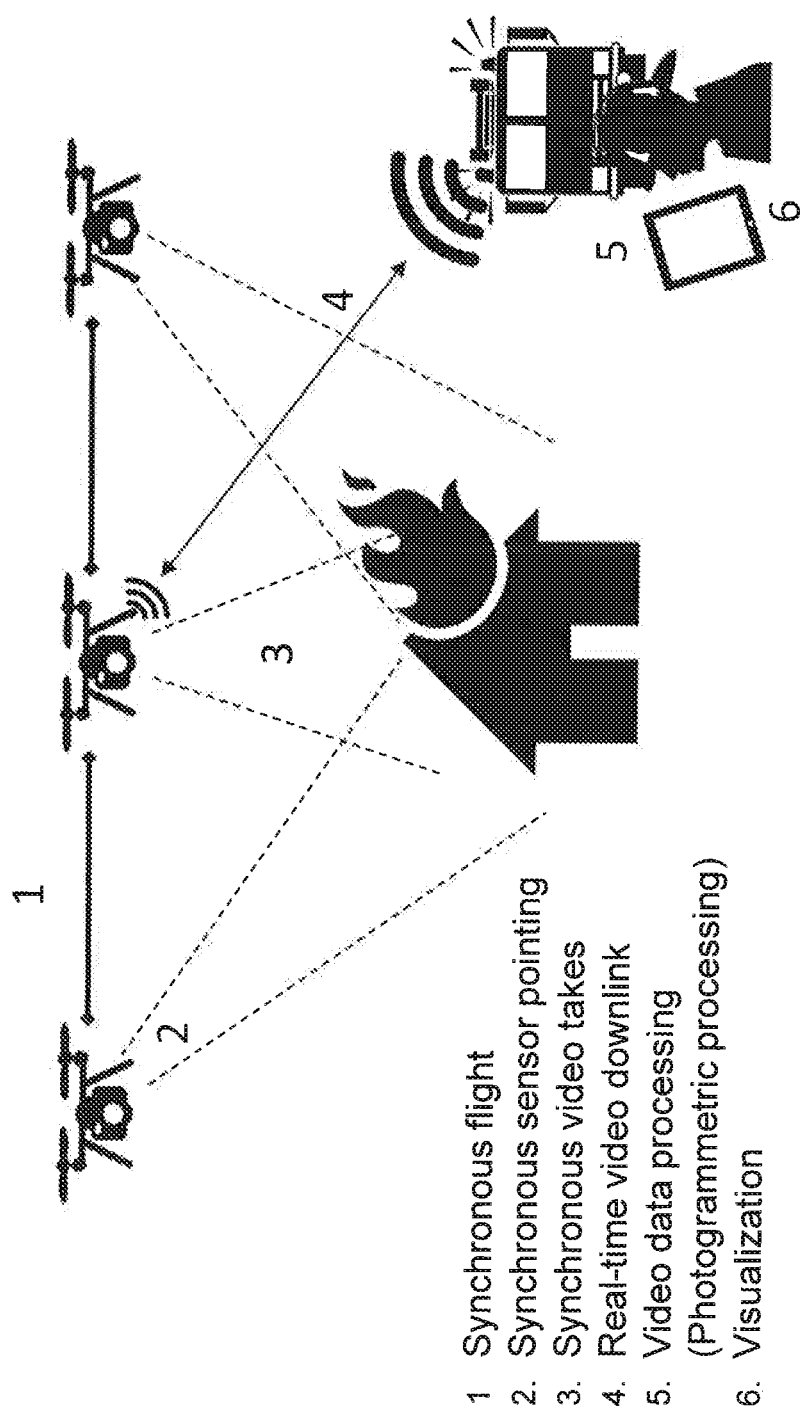
FIG. 2 is a schematic diagram illustrating an example of an overall system view including basic system components and basic functions.

For a system overview, reference can be made to the schematic examples illustrated in FIG. 1 and FIG. 2.

According to a second aspect, there is provided a system 100 configured to generate one or more video-based models of a target. The system 100 is configured to provide video streams from at least two moving or movable vehicles 10-1, 10-2, . . . , 10-*m* (m 2) equipped with cameras 20-1, 20-2, . . . , 20-*m* for simultaneously imaging the target 50 from different viewpoints. Position synchronization of the moving or movable vehicles 10-1, 10-2, . . . , 10-*m* is provided to create a stable image base. Pointing synchronization of the cameras 20-1, 20-2, . . . , 20-*m* is provided to cover the same object(s) and/or dynamic event(s), and time synchronization of the video frames of the video streams is enabled to obtain, for at least one point in time, a set of simultaneously registered video frames. The system 100 is also configured to generate, for said at least one point in time, at least one three-dimensional, 3D, model of the target based on the corresponding set of simultaneously registered video frames.

In a particular example, the system 100 is configured to enable time synchronization of the video frames of the video streams to obtain, for each of a plurality of points in time, a set of simultaneously registered video frames. The system 100 may be configured to generate, for each one of a selected set of the plurality of points in time, at least one 3D model of the target based on the corresponding set of simultaneously registered video frames Optionally, the system 100 is further configured to combine at least a subset of the generated 3D models to generate a four-dimensional, 4D, model of the target to enable a user to navigate through the 4D model in the three spatial dimensions and in the time dimension.

For example, the system may be configured to download or downlink image data based on the video streams to a ground segment 30 from at least one of the moving or movable vehicles and/or to operate a control uplink for controlling the moving or movable vehicles 10-1, 10-2, . . . , 10-*m* and/or the cameras 20-1, 20-2, . . . , 20-*m* from the ground segment 30.

In a particular example, the system is configured to separate background static objects from dynamic moving objects, and generate a coherent 3D model over the target including only static terrain and static objects, and create a database of dynamic moving objects in which solid moving objects and non-solid moving objects are classified and corresponding 3D models of the dynamic solid moving objects and 3D models of dynamic non-solid moving objects. The system may then be configured to generate the 4D model based on the 3D model of static terrain and static objects and the 3D models of the dynamic solid moving objects and 3D models of dynamic non-solid moving objects.

By way of example, the system 100 (see FIG. 6) comprises processing circuitry 110 and memory 120, the memory 120 comprising instructions, which when executed by the processing circuitry 110, cause the processing circuitry 110 to generate the video-based models of dynamic events, or electronic circuitry configured generate the video-based models of dynamic events.

According to a third aspect, there is provided a dynamic sensor system 25. The dynamic sensor system 25 comprises a set of synchronously operative moving or movable vehicles 10-1, 10-2, . . . , 10-*m* equipped with cameras 20-1, 20-2, . . . , 20-*m* to enable video streams for simultaneously imaging a target from different viewpoints. The dynamic sensor system 25 is configured to operate based on position synchronization of the moving or movable vehicles 10-1, 10-2, . . . , 10-*m* to create a stable image base, and the dynamic sensor system 25 is configured to operate based on pointing synchronization of the cameras 20-1, 20-2, . . . , 20-*m* to cover the same object(s) and/or dynamic event(s). The dynamic sensor system 25 is also configured to enable time synchronization of the video frames of the video streams to allow, for at least one point in time, generation and/or extraction of a set of simultaneously registered video frames. The dynamic sensor system 25 is further configured to downlink image data of the video streams to a ground segment 30 from at least one of the moving or movable vehicles 10-1, 10-2, . . . , 10-*m* to enable generation of one or more three-dimensional/four-dimensional, 3D/4D, models of the target based on the simultaneously registered video frames at the ground segment 30.

By way of example, the dynamic sensor system 25 enables the formation of an aerial segment of synchronously operative drones 10-1, 10-2, . . . , 10-*m* having on-board cameras 20-1, 20-2, . . . , 20-*m* to allow for the synchronized video streams for simultaneously imaging the target from different viewpoints.

According to a fourth aspect, there is provided a ground-based system 30 configured to generate one or more video-based models of a target. The system 30 is configured to receive video streams from at least two moving or movable vehicles 10-1, 10-2, 10-*m* equipped with cameras 20-1, 20-2, . . . , 20-*m* for simultaneously imaging the target 50 from different viewpoints. The moving or movable vehicles 10-1, 10-2, 10-*m* being operated based on position synchronization for a stable image base, and the cameras 20-1, 20-2, . . . , 20-*m* being operated based on pointing synchronization for covering the same object(s) and/or dynamic event(s), and time synchronization of the video frames of the video streams being enabled to allow, for at least one point in time, generation and/or extraction of a set of simultaneously registered video frames. The system 30 is also configured to generate, for said at least one point in time, at least one three-dimensional, 3D, model of the target based on the corresponding set of simultaneously registered video frames.

In a particular example, the system 30 is configured to enable time synchronization of the video frames of the video streams to obtain, for each of a plurality of points in time, a set of simultaneously registered video frames. The system 30 may then be configured to generate, for each one of a selected set of the plurality of points in time, at least one 3D model of the target based on the corresponding set of simultaneously registered video frames.

Further, the system 30 may optionally be configured to combine at least a subset of the generated 3D models to generate a four-dimensional, 4D, model of the target to enable a user to navigate through the 4D model in the three spatial dimensions and in the time dimension.

For example, the system 30 is configured to operate a control uplink for controlling the moving or movable vehicles 10-1, 10-2, . . . , 10-*m* and/or the cameras 20-1, 20-2, 20-*m*.

By way of example, the system 30 may be configured to determine the position synchronization and pointing synchronization and send command on the control uplink to adapt the position synchronization and pointing synchronization of the moving or movable vehicles 10 and/or the cameras 20.

By way of example, the system 30 (see FIG. 6) comprises processing circuitry 110 and memory 120, the memory 120 comprising instructions, which when executed by the processing circuitry 110, cause the processing circuitry 110 to generate the video-based models of dynamic events, or electronic circuitry configured generate the video-based models of dynamic events.

In the following, the proposed technology will be described with reference to various non-limiting examples for illustrative purposes.

For simplicity, the innovation will now mainly be described in the context of two drones with video cameras. However, the innovation works equally well with more simultaneous drones and some quality aspects would be even better with more drones.

In particular embodiments, the proposed technology is based on three types of synchronization:
Position synchronization of the drones to create a precise, stable and known image base;
Pointing synchronization of the cameras in order to cover the same object;
Time synchronization of the frames in the video stream to get simultaneous images of the same object.

For many user applications, there is another important part of the innovation, namely the real-time aspect:
Real-time downlink of the video stream
Real-time processing
Real-time visualization of the 4D model For a better understanding of the present invention it may be useful to begin with a brief system overview. Although the drones are aerial in this particular set of examples, it should be understood that surface-based vehicles or even underwater vehicles may be employed to capture the video sequences.

Example of Overall System

In this example, the system comprises (see FIG. 1 and/or FIG. 2
Aerial Segment
A swarm (two or more) of drones controlled from the Ground Segment;
At least one of the drones can download the image data from the swarm to the Ground Segment.
Sensor/video/camera system
Normally a frame camera on-board each of the drones;
Frame rate of the camera can depend on the application.
Ground Segment
Normally located in the front line and keeps the overall control of the system, including one or more of the following:
Drone flight control,
Reception of data from the swarm,
Processing of the data,
Visualization and decision-making tool for the front-line officer,
Potential external communication, sharing of data with back-office, etc.
Target
Any kind of target such as a dynamic event where real-time 3D/4D models would facilitate decision-making, e.g. fires, accidents, flooding or other security or military operations. Other target scenarios may include sports events, movie productions and the like.

Examples of Position Synchronization of the Drones

Figure 3:
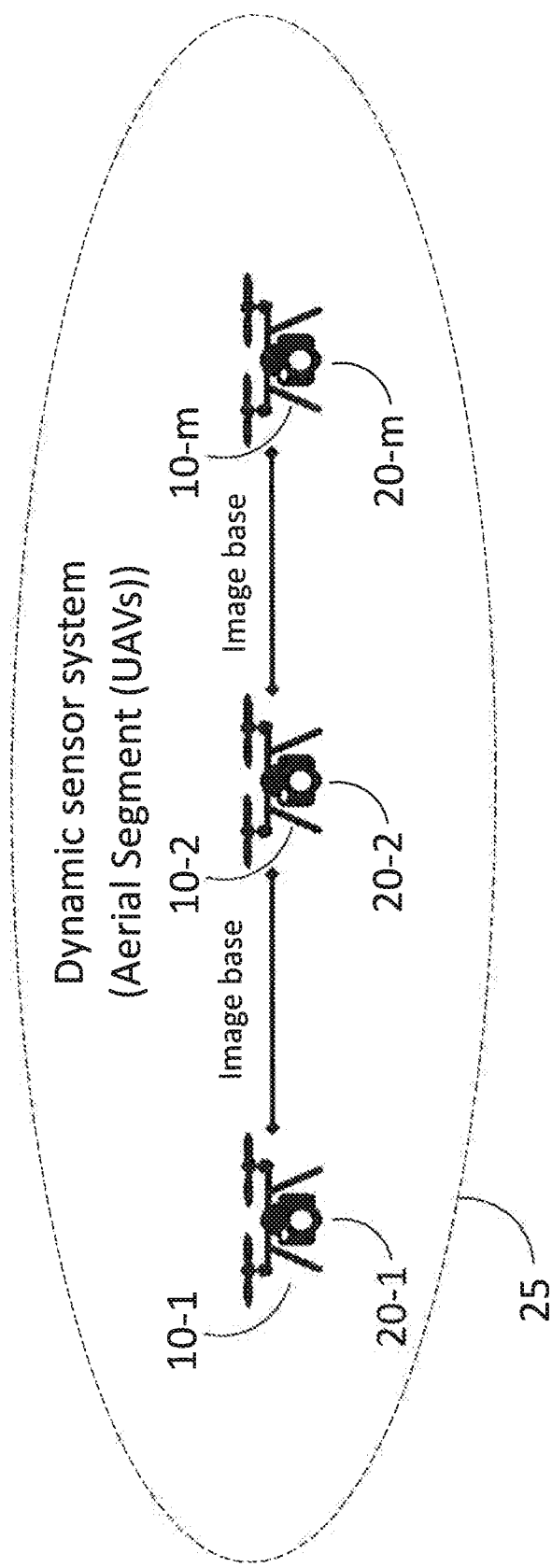
FIG. 3 is a schematic diagram illustrating an example of a dynamic sensor system, here exemplified as an aerial segment based on drones equipped with on-board cameras.

The image base (See FIG. 2 and FIG. 3), i.e. the distance between the drones, is optimized for accurate automatic 3D point reconstruction and is dependent on the height above the terrain and intrinsic parameters of the cameras.

With particular reference to FIG. 2, the synchronous drone flight 1 (including the sensor pointing 2) may be controlled from the ground segment by a front-line officer, mainly using pre-set parameters for the flight. As an alternative, the flight may be controlled autonomously.

By way of example, the overlap area between synchronized video frames may be determined as an integrated step in the generation of 4D models. This overlap may in a particular example be used to determine how the drones need to be reconfigured to maintain an optimal positioning and pointing synchronization. The commands required to update the drones positioning and pointing synchronization may in this example be computed and sent to the drones autonomously by the system.

As mentioned, the positioning and/or pointing synchronization correspond to relative orientation, which if desired can be computed continuously in real-time based on the content of the video streams and used to control the drones and/or cameras such that they obtain and/or maintain desired positioning and/or pointing synchronization.

For example, position synchronization may be realized by a radio link between the drones (direct or through a ground radio station), in which the positions of the drones are communicated so that a correct base-to-height ratio can be maintained.

As another example, position synchronization may be realized by a flight plan, which is created before the mission, in which distance between the drones is set to a constant value based on flying height, field-of-view and other parameters.

Examples of Pointing Synchronization of the Cameras

In order to make sure that target is covered in an optimal way for photogrammetric processing of the video data, the system may be using automatic or manual pointing of the cameras.

As an example, to maximize the overlap area covered by both (or all) drones, the cameras are convergently pointing at the same object, which is imaged in the center of each image.

As another example, relaxing the requirements on pointing synchronization, the cameras may be pointing strictly downwards in nadir. The overlap area is then determined by the base-to-height ratio and the intrinsic parameters of the camera, such as the field-of-view.

As an example, pointing synchronization may be realized by a radio link between the drones (possibly through a ground radio station), in which the positions of the drones are communicated so that a correct target object to center at can be calculated.

Examples of Time Synchronization of the Frames

In order to make it possible to create 4D models of moving targets, the sensor/camera in each drone needs to take a video frame at the same moment as the cooperative drone (synchronous video takes 3), otherwise the target will move or change shape between the frame takes.

The precision of the timing, as well as the video frame rate, is dependent on the requirements from each specific application. In addition, each frame may be associated with a precise time tagging.

As an example, time synchronization may be realized by matching an image of a moving object from one drone at time $t_i$ with a sequence of images at times $[t_{i-n} \ldots t_{i+n}]$ from a second drone to find the optimal co-occurrence of the moving object at time $t_j$; $-n<=j<=+n$. The difference in time, $\Delta t = t_j - t_i$, is equivalent with a difference in frame indexes in the video sequences, thus enabling time synchronization to the accuracy of the video frame rate, e.g. $\frac{1}{30}$ seconds. This time calibration can be iterated during flight to avoid time drifts due to e.g. differing internal camera clocks.

As another example, time synchronization may be realized by using a single electronic shutter, connected to both (all) drones before the mission, thus starting the cameras at the exact same time.

As another example, a distinctly coloured light is lit while both (all) drones are imaging. The index of the first frame in which the light is visible is automatically detected in each video. The difference in frame indexes define the time shift between the videos.

Examples of Communication Link(s)

A communication link 4 may be established between the aerial segment and the ground segment, including at least a real-time video downlink, and optionally a control link (uplink) for controlling the aerial segment, e.g. the drones and/or the sensors.

Examples of Processing for 3D Models

Examples of features for processing 5 for Real-time 3D models:

- The interior orientations (i.e. the physical characteristics of the cameras) may be determined before or during mission, using targets or natural objects.
- Each set/pair of images from different videos/cameras, but the same time t, may be oriented relative each other through image matching and sensor orientation.
- Stereo images, ready to be displayed stereoscopically in VR headsets or with 3D glasses, may be generated, preferably at each of a plurality of points in time (so that a video may be viewed stereoscopically).
- Dense image matching may be performed on the stereo images to generate depth maps, i.e. images where the pixel value is the relative distance between camera and imaged object.
- GPS (Global Positioning System) and IMU (Inertial Measurement Unit) data may be used to calculate object coordinates (X,Y,Z) from the depth maps and to calculate exterior orientation (i.e. the position and orientations of the cameras)→point clouds and digital surface models (DSM), thus enabling the production of georeferenced 3D models or point clouds from dense matching.
- Orientation data and depth maps from a sequence of already calculated frames may be used to predict the data at the currently processed frame to speed up calculations.
- Depth maps and/or DSM:s may be saved to enable replaying the real-time scenario and to provide input for the Near-Real-time process.

Examples of Processing for 4D Models

Examples of features for processing 5 for Near-Real-time 4D models:

- For all synchronized video streams (two or more) or for a certain time span, matching may be made between frames within each video stream.
- Together with the depth maps between video streams from the Real-time solution, we get observations for a block of images.
- The block of images may be adjusted to estimate globally optimal orientation data.
  - This may initially be done without GPS and IMU data, in which case absolute orientation of the block is done after the adjustment,
  - Or GPS and IMU observations can be included in the adjustment.
- Dense image matching may be performed using the adjusted sensor parameters and existing depth maps from Real-time processing.
- Areas with moving objects can be identified using the depth maps, optical flow and e.g. affine and projective factorization.
- A coherent 3D model over the entire area and including only static terrain and objects (which do not move) may be created.
- A database with moving objects may be created in which (i) solid and (ii) deformable moving objects are classified. The database may include time-dependent 3D models.
- Together the static and moving object 3D-models define a 4D time-dependent model of the entire images area.

Examples of Visualization

The proposed technology may optionally also include a visualization and/or decision-making/support tool 6 based on the generated 3D/4D models of the static and/or dynamic events, as indicated herein.

Figure 4:
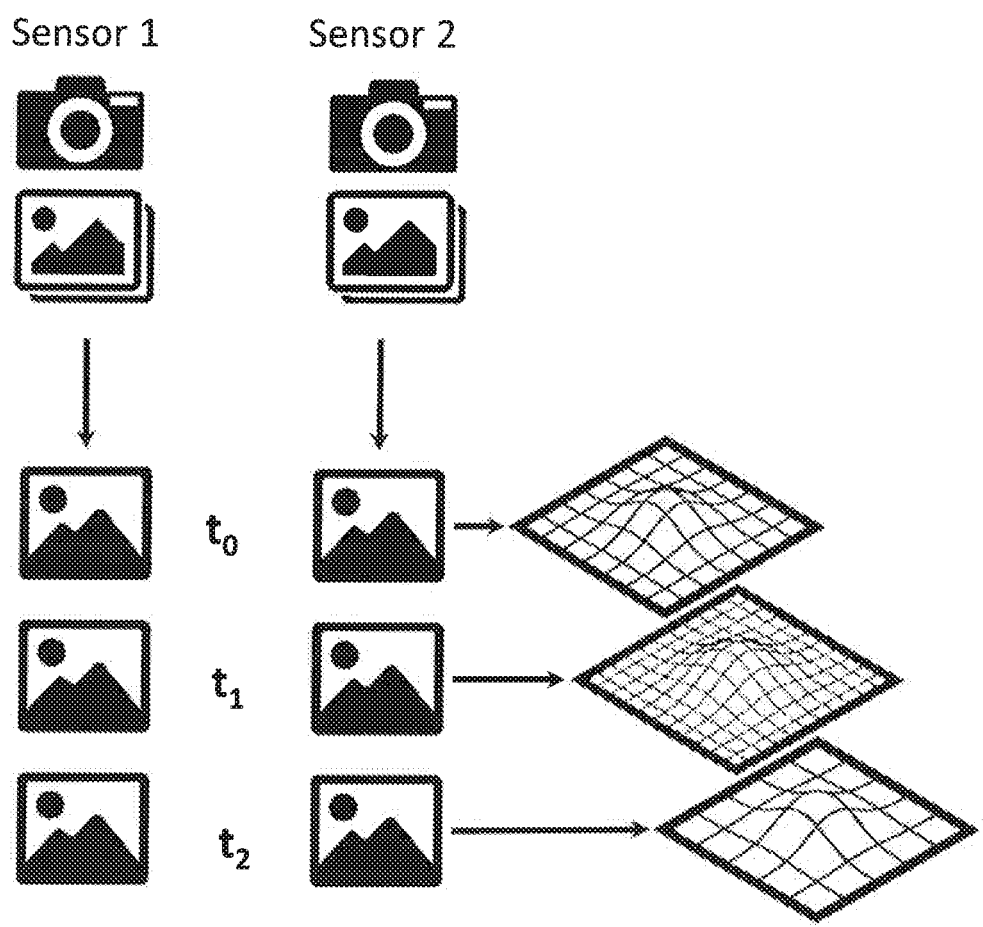
FIG. 4 is a schematic diagram illustrating an example of how momentary 3D models can be generated, e.g. from time-synchronized video frame pairs or more generally n-tuples for visualization and exploration.

FIG. 4 is a schematic diagram illustrating an example of how momentary 3D models can be generated, e.g. from time-synchronized video frame pairs or more generally n-tuples for visualization and exploration.

Figure 5:
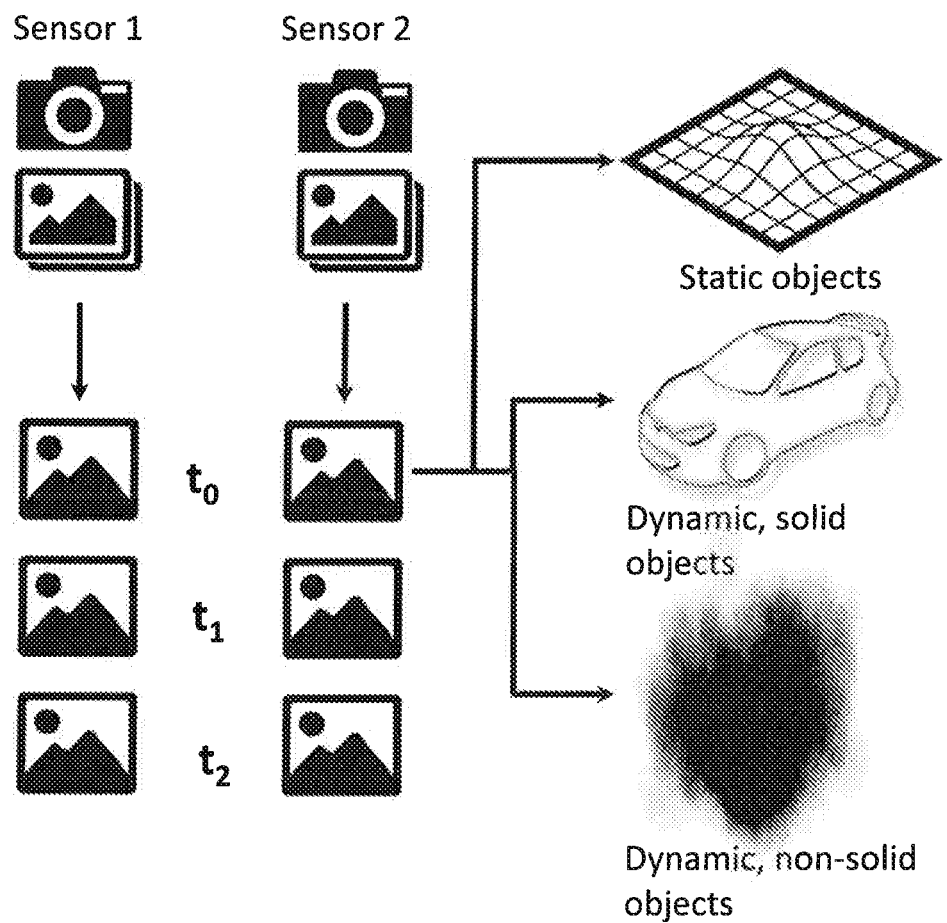
FIG. 5 is a schematic diagram illustrating an example of how the momentary 3D models together can be used to build near real-time 4D models for visualization and exploration.

FIG. 5 illustrate an example of how the momentary 3D models together can be used to build real-time and near real-time 4D models for visualization and exploration.

In a particular non-limiting example, for simplicity illustrated with reference to two sensors in FIG. 4, real-time processing may give the user an immediate, but somewhat limited, 4D view of the target:

1. Sensors 1 and 2 take a stream of video frames, creating an image pair at each moment.
2. From each image pair, the system processes a momentary 3D model in real-time.
3, Each 3D model is exported as a raster (in "image space") to the visualization module. Together they compose a 4D model of the target.

For simplicity, the graphics show only two flying sensors, but the system could handle more sensors, which would improve quality of the real-time 4D model.

For example, real-time visualization may be a 4D model which gives the user an immediate and improved impression of the target. This view is much better than just watching the real-time video from one drone, since the viewpoint and the zooming can be adapted to the user's preference.

In addition, manual and automatic measurements such as height and volume can be made in the 4D models.

In a particular non-limiting example, for simplicity illustrated with reference to two sensors in FIG. 5, near real-time processing may give the user a somewhat delayed (by seconds), but full-scale 4D view of the target, which also can be studied in the time domain (go backwards to see what happened earlier):

1. Creating momentary 3D models from Sensors 1 and 2 is similar, but parallel, to the Real-time processing.
2. The system separates the background static objects from the dynamic moving objects.
3. The system separates solid from non-solid moving objects.
4. The 3D models of static objects and the dynamic solid objects are exported as TINs (in "object space") to the exploration module, A TIN (Triangulated Irregular Network) is a representation of a continuous surface consisting entirely of triangular facets.

5. The 3D models of dynamic non-solid objects are exported as a point cloud (in "object space") to the exploration module.
6. Together all the 3D models compose a 4D model of the target.

Digital TIN data structures may be used in a variety of applications, including geographic information systems (GIS), and computer aided drafting (CAD) for the visual representation of a topographical surface. A TIN is normally a vector-based representation of the physical land surface or sea bottom, made up of irregularly distributed nodes and lines with three-dimensional coordinates (x, y, and z) that are arranged in a network of non-overlapping triangles.

For simplicity, the graphics show only two flying sensors, but the system could handle more sensors, which would improve quality of the real-time 4D model.

For example, near real-time exploration may involve a tool for deeper analysis. By way of example, it may store the generated 4D models and may visualize the models simultaneously, also in the time domain. The tool may also allow for more advanced analysis, as for example:

Object tracking
Changes of target volume
Static models of moving objects
Object identification.

At least some of the steps, functions, procedures, modules and/or blocks described herein may be implemented in software such as a computer program for execution by suitable processing circuitry such as one or more processors or processing units. Examples of processing circuitry includes, but is not limited to, one or more microprocessors, one or more Graphics Processing Unit (GPU), one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

Alternatively, or as a complement, at least some of the steps, functions, procedures, modules and/or blocks described herein may be implemented in hardware using any conventional technology, such as discrete circuit or integrated circuit technology, including both general-purpose electronic circuitry and application-specific circuitry. It should also be understood that it may be possible to re-use the general processing capabilities of any conventional device or unit in which the proposed technology is implemented. It may also be possible to re-use existing software, e.g. by reprogramming of the existing software or by adding new software components.

The overall functionality may also be partitioned between programmed software, SW, for execution on one or more processors, and one or more pre-configured or possibly reconfigurable hardware circuits such as ASICs and/or FPGAs. The actual hardware-software partitioning can be decided by a system designer based on a number of factors including processing speed, cost of implementation and other requirements.

Figure 6:
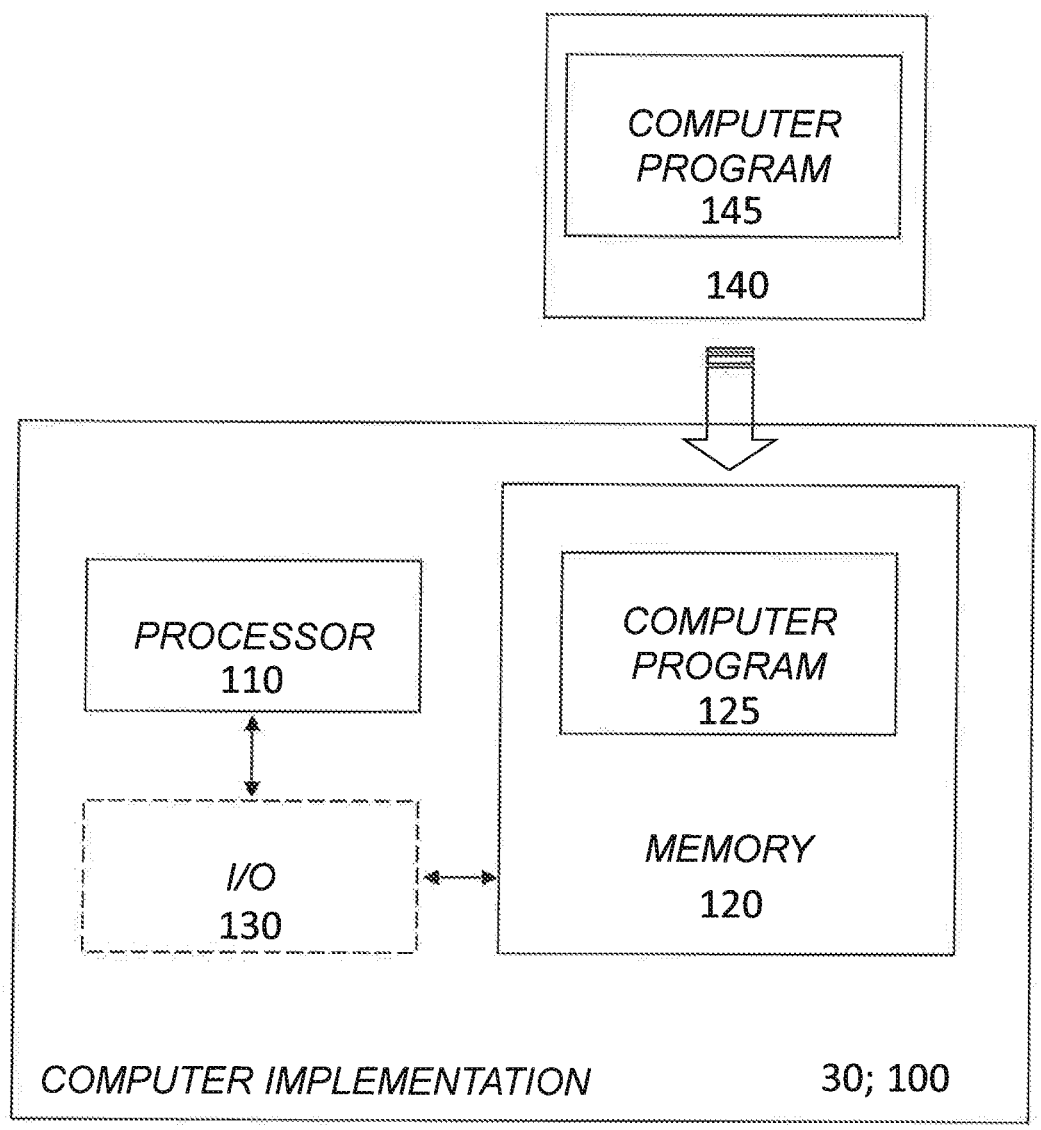
FIG. 6 is a schematic diagram illustrating an example of a computer-implementation according to an embodiment.

FIG. 6 is a schematic diagram illustrating an example of a computer-implementation according to an embodiment. In this particular example, at least some of the steps, functions, procedures, modules and/or blocks described herein are implemented in a computer program, which is loaded into the memory for execution by processing circuitry 110 including one or more processors. The processor(s) 110 and memory 120 are interconnected to each other to enable normal software execution. An optional input/output device 130 may also be interconnected to the processor(s) 110 and/or the memory 120 to enable input and/or output of relevant data such as input parameter(s) and/or resulting output parameter(s).

In a particular embodiment, processing and visualization may share memory resources through GPU interoperability.

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

In a particular embodiment, the computer program 125; 145 comprises instructions, which when executed by at least one processor 110, cause the processor(s) 110 to perform at least part of the steps and/or actions or tasks described herein.

In a particular example, there is provided a computer program 125; 145 for generating, when executed by a processor 110, one or more video-based models of a target. The computer program 125; 145 comprises instructions, which when executed by the processor 110, cause the processor 110 to:
receive video streams from at least two moving or movable vehicles equipped with cameras for simultaneously imaging the target from different viewpoints,
the moving or movable vehicles being operated based on position synchronization for a stable image base,
the cameras being operated based on pointing synchronization for covering the same object(s) and/or dynamic event(s), and
time synchronization of the video frames of the video streams being provided to obtain, for at least one point in time, a set of simultaneously registered video frames; and
generate, for said at least one point in time, at least one three-dimensional, 3D, model or four-dimensional, 4D, model of the target based on the corresponding set of simultaneously registered video frames.

Optionally, with several 3D models being generated over a plurality of points in time, it is possible to combine at least a subset of the generated 3D models over the plurality of points in time to generate a four-dimensional, 4D, model of the target to enable a user to navigate through the 4D model in the three spatial dimensions and in the time dimension.

By way of example, the software or computer program 125; 145 may be realized as a computer program product, which is normally carried or stored on a computer-readable medium 120; 140, in particular a non-volatile medium. The computer program 125; 145 may thus be loaded into the operating memory 120 of a computer or equivalent processing device for execution by the processing circuitry 110 thereof.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible.

The invention claimed is:

1. A method for generating one or more video-based models of a target, wherein the method comprises:
    providing video streams from at least two moving or movable vehicles equipped with cameras for simultaneously imaging the target from different viewpoints,
        wherein position synchronization of the moving or movable vehicles is provided to create a stable image base, which represents the distance between the moving or movable vehicles,
        wherein pointing synchronization of the cameras is provided to cover the same object(s) and/or dynamic event(s), and
        wherein time synchronization of the video frames of the video streams is provided to obtain, for at least one point in time, a set of simultaneously registered video frames,
    generating, for said at least one point in time, at least one three-dimensional, 3D, model of the target based on the corresponding set of simultaneously registered video frames,
    wherein time synchronization of the video frames of the video streams is provided to obtain, for each of a plurality of points in time, a set of simultaneously registered video frames, and
    wherein at least one 3D model of the target is generated, for each one of a selected set of the plurality of points in time, based on the corresponding set of simultaneously registered video frames, and
        combining at least a subset of the generated 3D models to generate a four-dimensional, 4D, model, as a series of time-dependent 3D models, of the target to enable a user to navigate through the 4D model in the three spatial dimensions and in the time dimension,
    wherein stereo images, ready to be displayed stereoscopically in Virtual Reality headset or with 3D glasses, are generated based on the registered video frames, and
    wherein dense image matching is performed on the stereo images to generate depth maps, where each pixel value represents relative distance between camera and imaged object, and areas with moving objects are identified using the depth maps.

2. The method of claim 1, wherein image data based on the video streams are downlinked to a ground segment from at least one of the moving or movable vehicles and/or a control uplink is operated for controlling the moving or movable vehicles and/or the cameras from the ground segment.

3. The method of claim 1, wherein the moving or movable vehicles include drones or unmanned aerial vehicles (UAVs), each having an on-board camera.

4. The method of claim 1, wherein the camera in each moving or movable vehicle takes a video frame at the same moment as the camera of a cooperative vehicle to provide for synchronous video takes.

5. The method of claim 1, wherein the time synchronization is realized by matching an image of a moving object from a first vehicle at time $t_i$ with a sequence of images at times $[t_{i-n} \ldots t_{i+n}]$ from a second vehicle to find the optimal co-occurrence of the moving object at time $t_j$; $-n \leq j \leq +n$, and a difference in time, $\Delta t = t_j - t_i$, is equivalent with a difference in frame indexes in the video sequences, thus enabling time synchronization to the accuracy of the video frame rate, or
    wherein the time synchronization is based on detecting the index of the first frame in which a distinctly colored light, lit while cameras of the moving or movable vehicles are imaging, is visible in each video, and defining the time shift between the videos as the difference in frame indexes, or
    wherein the time synchronization is realized by starting the cameras at the exact same time.

6. A method for generating one or more video-based models of a target, wherein the method comprises:
    providing video streams from at least two moving or movable vehicles equipped with cameras for simultaneously imaging the target from different viewpoints,
        wherein position synchronization of the moving or movable vehicles is provided to create a stable image base, which represents the distance between the moving or movable vehicles,
        wherein pointing synchronization of the cameras is provided to cover the same object(s) and/or dynamic event(s), and
        wherein time synchronization of the video frames of the video streams is provided to obtain, for at least one point in time, a set of simultaneously registered video frames,
    generating, for said at least one point in time, at least one three-dimensional, 3D, model of the target based on the corresponding set of simultaneously registered video frames,
    wherein time synchronization of the video frames of the video streams is provided to obtain, for each of a plurality of points in time, a set of simultaneously registered video frames, and
    wherein at least one 3D model of the target is generated, for each one of a selected set of the plurality of points in time, based on the corresponding set of simultaneously registered video frames, and
        combining at least a subset of the generated 3D models to generate a four-dimensional, 4D, model, as a series of time-dependent 3D models, of the target to enable a user to navigate through the 4D model in the three spatial dimensions and in the time dimension,
    wherein a coherent 3D model over an entire area and including only static terrain and objects which do not move is created, and a database with moving objects is created including time-dependent 3D models, and wherein the coherent 3D model and the moving object 3D-models together define a 4D time-dependent model, and/or
    wherein background static objects are separated from dynamic moving objects, and a coherent 3D model over the target including only static terrain and static objects is generated, and a database of dynamic moving objects is created in which solid moving objects and non-solid moving objects are classified and corresponding 3D models of the dynamic solid moving objects and 3D models of dynamic non-solid moving objects are provided, wherein the 4D model is based on the 3D model of static terrain and static objects and the 3D models of the dynamic solid moving objects and 3D models of dynamic non-solid moving objects.

7. The method of claim 6, wherein the 3D models of static objects and the dynamic solid objects are extracted as Triangulated Irregular Network (TIN) data structures.

8. A system configured to generate one or more video-based models of a target,
   wherein the system is configured to provide video streams from at least two moving or movable vehicles equipped with cameras for simultaneously imaging the target from different viewpoints,
       wherein position synchronization of the moving or movable vehicles is provided to create a stable image base,
       wherein pointing synchronization of the cameras is provided to cover the same object(s) and/or dynamic event(s), and
       wherein time synchronization of the video frames of the video streams is enabled to obtain, for at least one point in time, a set of simultaneously registered video frames,
   wherein the system is configured to generate, for said at least one point in time, at least one three-dimensional, 3D, model of the target based on the corresponding set of simultaneously registered video frames,
   wherein the system is configured to enable time synchronization of the video frames of the video streams to obtain, for each of a plurality of points in time, a set of simultaneously registered video frames,
   wherein the system is configured to generate, for each one of a selected set of the plurality of points in time, at least one 3D model of the target based on the corresponding set of simultaneously registered video frames,
   wherein the system is configured to combine at least a subset of the generated 3D models to generate a four-dimensional, 4D, model, as a series of time-dependent 3D models, of the target to enable a user to navigate through the 4D model in the three spatial dimensions and in the time dimension, and
   wherein the system is configured to create a coherent 3D model over an entire area and including only static terrain and objects which do not move, and to create a database with moving objects including time-dependent 3D models, and to combine the coherent 3D model and the moving object 3D-models to define a 4D time-dependent model.

9. The system of claim 8, wherein the system is configured to download or downlink image data based on the video streams to a ground segment from at least one of the moving or movable vehicles and/or to operate a control uplink for controlling the moving or movable vehicles and/or the cameras from the ground segment.

10. The system of claim 8, wherein the system comprises processing circuitry and memory, the memory comprising instructions, which when executed by the processing circuitry, cause the processing circuitry to generate the video-based models of dynamic events, or electronic circuitry configured to generate the video-based models of dynamic events.

11. A dynamic sensor system, wherein the dynamic sensor system comprises a set of synchronously operative moving or movable vehicles equipped with cameras to enable video streams for simultaneously imaging a target from different viewpoints,
   wherein the dynamic sensor system is configured to operate based on position synchronization of the moving or movable vehicles to create a stable image base,
   wherein the dynamic sensor system is configured to operate based on pointing synchronization of the cameras to cover the same object(s) and/or dynamic event(s),
   wherein the dynamic sensor system is configured to enable time synchronization of the video frames of the video streams to allow, for at least one point in time, generation and/or extraction of a set of simultaneously registered video frames,
   wherein the dynamic sensor system is configured to downlink image data of the video streams to a ground segment from at least one of the moving or movable vehicles to enable generation of one or more three-dimensional/four-dimensional, 3D/4D, models of the target based on the simultaneously registered video frames at the ground segment,
   wherein the dynamic sensor system is configured to enable time synchronization of the video frames of the video streams to allow, for each of a plurality of points in time, generation and/or extraction of a set of simultaneously registered video frames,
   wherein the dynamic sensor system is configured to downlink image data of the video streams to a ground segment from at least one of the moving or movable vehicles to enable generation, for each one of a selected set of the plurality of points in time, of at least one 3D model of the target based on the corresponding set of simultaneously registered video frames and to enable combination of at least a subset of the 3D models to generate a four-dimensional, 4D, model, as a series of time-dependent 3D models, of the target, and
   wherein the dynamic sensor system is configured to create a coherent 3D model over an entire area and including only static terrain and objects which do not move, and to create a database with moving objects including time-dependent 3D models, and to combine the coherent 3D model and the moving object 3D-models to define a 4D time-dependent model.

12. The dynamic sensor system of claim 11, wherein the dynamic sensor system enables the formation of an aerial segment of synchronously operative drones having on-board cameras to allow for simultaneously imaging the target from different viewpoints.

13. A ground-based system configured to generate one or more video-based models of a target,
   wherein the system is configured to receive video streams from at least two moving or movable vehicles equipped with cameras for simultaneously imaging the target from different viewpoints,
       the moving or movable vehicles being operated based on position synchronization for a stable image base,
       the cameras being operated based on pointing synchronization for covering the same object(s) and/or dynamic event(s), and
       time synchronization of the video frames of the video streams being enabled to allow, for at least one point in time, generation and/or extraction of a set of simultaneously registered video frames,
   wherein the system is configured to generate, for said at least one point in time, at least one three-dimensional, 3D, model of the target based on the corresponding set of simultaneously registered video frames,
   wherein the system is configured to enable time synchronization of the video frames of the video streams to obtain, for each of a plurality of points in time, a set of simultaneously registered video frames, wherein the system is configured to generate, for each one of a selected set of the plurality of points in time, at least one 3D model of the target based on the corresponding set of simultaneously registered video frames, wherein the system is configured to combine at least a subset of the generated 3D models to generate a four-dimensional, 4D, model of the target to enable a user to navigate through the 4D model in the three spatial dimensions and in the time dimension, and wherein the system is configured to create a coherent 3D model over an entire area and including only static terrain and objects which do not move, and to create a database with moving objects including time-dependent 3D models, and to combine the coherent 3D model and the moving object 3D-models to define a 4D time-dependent model.

14. The ground-based system of claim 13, wherein the system is configured to operate a control uplink for controlling the moving or movable vehicles and/or the cameras.

15. The ground-based system of claim 14, wherein the system is configured to determine the position synchronization and pointing synchronization and send commands on the control uplink to adapt the position synchronization and pointing synchronization of the moving or movable vehicles and/or the cameras.

16. The ground-based system of claim 13, wherein the system comprises processing circuitry and memory, the memory comprising instructions, which when executed by the processing circuitry, cause the processing circuitry to generate the video-based models of dynamic events, or electronic circuitry configured to generate the video-based models of dynamic events.

17. A computer-program product comprising a non-transitory computer-readable medium carrying a computer program for generating, when executed by a processor, one or more video-based models of a target, wherein the computer program comprises instructions, which when executed by the processor, cause the processor to:

receive video streams from at least two moving or movable vehicles equipped with cameras for simultaneously imaging the target from different viewpoints, the moving or movable vehicles being operated based on position synchronization for a stable image base, the cameras being operated based on pointing synchronization for covering the same object(s) and/or dynamic event(s), and time synchronization of the video frames of the video streams being provided to obtain, for at least one point in time, a set of simultaneously registered video frames, generate, for said at least one point in time, at least one three-dimensional, 3D, model or four-dimensional, 4D, model of the target based on the corresponding set of simultaneously registered video frames, wherein time synchronization of the video frames of the video streams is provided to obtain, for each of a plurality of points in time, a set of simultaneously registered video frames, and wherein at least one 3D model of the target is generated, for each one of a selected set of the plurality of points in time, based on the corresponding set of simultaneously registered video frames, and combine at least a subset of the generated 3D models to generate a four-dimensional, 4D, model, as a series of time-dependent 3D models, of the target to enable a user to navigate through the 4D model in the three spatial dimensions and in the time dimension, wherein a coherent 3D model over an entire area and including only static terrain and objects which do not move is created, and a database with moving objects is created including time-dependent 3D models, and wherein the coherent 3D model and the moving object 3D-models together define a 4D time-dependent model, and/or wherein background static objects are separated from dynamic moving objects, and a coherent 3D model over the target including only static terrain and static objects is generated, and a database of dynamic moving objects is created in which solid moving objects and non-solid moving objects are classified and corresponding 3D models of the dynamic solid moving objects and 3D models of dynamic non-solid moving objects are provided, wherein the 4D model is based on the 3D model of static terrain and static objects and the 3D models of the dynamic solid moving objects and 3D models of dynamic non-solid moving objects.

\* \* \* \* \*